United States Patent
Pettitt et al.

(10) Patent No.: US 7,181,065 B2
(45) Date of Patent: Feb. 20, 2007

(54) ENHANCED COLOR CORRECTION CIRCUITRY CAPABLE OF EMPLOYING NEGATIVE RGB VALUES

(75) Inventors: Gregory S. Pettitt, Rowlett, TX (US); Bradley W. Walker, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 414 days.

(21) Appl. No.: 10/753,697

(22) Filed: Jan. 7, 2004

(65) Prior Publication Data
US 2005/0147294 A1    Jul. 7, 2005

(51) Int. Cl.
*G06K 9/00* (2006.01)
(52) U.S. Cl. ....................................................... 382/167
(58) Field of Classification Search ................ 382/162, 382/167, 274; 358/518; 345/600, 604
See application file for complete search history.

(56) References Cited

U.S. PATENT DOCUMENTS

| | | | |
|---|---|---|---|
| 6,101,271 A * | 8/2000 | Yamashita et al. | 382/167 |
| 6,594,387 B1 | 7/2003 | Pettitt et al. | |
| 6,947,177 B2 * | 9/2005 | Smith | 358/1.9 |

* cited by examiner

*Primary Examiner*—Phuoc Tran
(74) *Attorney, Agent, or Firm*—Charles A. Brill; Wade James Brady, III; Frederick J. Telecky, Jr.

(57) ABSTRACT

Disclosed is a system for adjusting a plurality of component color signals for expanded color gamut displays. The disclosed system comprises an input for receiving the component color signals, a detection circuit (502) connected to the input and configured to detect at least one characteristic of the received component color signals, and an adjustment circuit (504) connected to the input for receiving the component color signal and for creating adjusted component color signals from the received component color signals according to a certain technique, where the certain technique is changed according to the detected characteristic.

30 Claims, 3 Drawing Sheets

ENHANCED COLOR CORRECTION CIRCUITRY CAPABLE OF EMPLOYING NEGATIVE RGB VALUES

FIELD OF THE INVENTION

Disclosed are systems and methods related to the field of display systems, more particularly to color correction of display systems, particularly display systems using primary color sources to generate full-color images.

BACKGROUND OF THE INVENTION

Image display systems create images for human viewers to experience. The goal of such a display system is to simulate the experience of being at the location being displayed. The locations may be real, for example when a scene is recorded using a camera, imaginary, for example when a computer generates a scene using a database of shape and texture information, or a combination of real images and superimposed computer-generated images.

Regardless of the source of a particular image, the display system must be able to recreate complex color tones and intensities in order to make the recorded image appear life-like. To do this, the color spectrum of the display system must be correlated to the color spectrum of the device used to capture the image. This can be a particular challenge when displaying an image initially recorded on a continuous color media such as cinemagraphic film for display on a primary color based system such as a Cathode Ray Tube (CRT), Liquid Crystal Display (LCD), Digital Micromirror Display ("DMD")-based display, or plasma display. For the purposes of this application, the term "continuous color" used in conjunction with terms such as image, media, display, or system will refer to the characteristic of being comprised of a continuous spectrum of light compared to the term "primary color" which will refer to the characteristic of being comprised of light from discrete primary color bands. Primary color-based image display systems, such as the ones listed above, use light sources that create a limited color space or color gamut, which can be defined by a chromaticity diagram, as is further discussed below. Commonly, a standard CRT color gamut is the benchmark for RGB signals, where positive RGB signals will define the color space that is formed by a CRT monitor according to the self-luminance properties of the phosphors used.

The perceived color of an object is determined by the wavelength of the light emitted by or reflected by the object. The human eye contains sensors, called rods and cones, that detect the light from the object focused on the retina. Rods are responsible for low light vision. Cones are responsible for color vision. There are three types of cones in the human eye, each with a distinct wavelength passband. Using outputs from the three types of cones, the human brain creates the perception of color and intensity for each portion of an image.

Continuous color media recreate the original image spectrum for each portion of the image. In the case of photographic film, this is accomplished by absorbing the unwanted portions of the spectrum of light from a source while reflecting or transmitting the portions needed to create an image. Primary color systems have a limited spectrum, or color gamut, and therefore cannot recreate the entire spectrum of the original image, but instead create the perception of the original image by stimulating the three types of cones to produce a response that approximates that would have been produced by the original spectrum. Thus, three carefully chosen light sources (red, green, and blue) can be used to provide the perception of a continuous color spectrum.

The three colors chosen to be the primary colors of a primary color display system determine the available color space of the display system. Light sources from the primary color systems have characteristics that narrow the systems' effective color gamut or color space. CRT and plasma displays will have a specific color gamut based on the light emission spectrum of the phosphors they contain, while other projection systems may have a color gamut that is defined by a filtered white light source. While a given set of primary colors may provide a very broad color space, the use of filters to select the given set of primary colors from a white light source often limits the maximum intensity the display system is capable of producing to less than a minimum acceptable amount. Further, a given selection of color filters may result in a white level, formed by combining the three primary colors, that has an undesirable color tint.

While an ideal display can create a high intensity display of very pure colors including white, real world display systems must make tradeoffs among the white level, purity of the primary colors, and the maximum available brightness. These tradeoffs further affect the secondary colors because the secondary colors are formed by combining primary colors at intensities that are set relative to the maximum intensities of those primary colors. Thus, once the primary color filters are selected, the white point and the purity of the secondary colors are also determined.

SUMMARY OF THE SYSTEM AND METHOD

Systems and methods described in this application provide for the enhanced color correction of image data with an expanded color gamut. Further disclosed is a method of correcting color image data for a pixel. A representative method comprises: providing image data for said pixel; converting the image data to a color space having a primary (P), secondary (S), and combined (W) color components; selecting a matrix corresponding to the color space; selecting a set of coefficients describing the contribution of the primary, secondary, and combined components to the output primaries; and calculating a corrected output value for each of the output primary according to the following equation:

$$\begin{bmatrix} R' \\ G' \\ B' \end{bmatrix} = \begin{bmatrix} PC1 & SC1 & WC1 \\ PC2 & SC2 & WC2 \\ PC3 & SC3 & WC3 \end{bmatrix} \begin{bmatrix} P \\ S \\ C \end{bmatrix}$$

where:
PC1 is the contribution of the primary color component to a 1st output primary (R');
SC1 is the contribution of the secondary color component to the 1st output primary (R');
WC1 is the contribution of the combined color component to the 1st output primary (R');
PC2 is the contribution of the primary color component to a 2nd output primary (G');
SC2 is the contribution of the secondary color component to the 2nd output primary (G');
WC2 is the contribution of the combined color component to the 2nd output primary (G');
PC3 is the contribution of the primary color component to a 3rd output primary (B');

SC3 is the contribution of the secondary color component to the 3rd output primary (B'); and WC3 is the contribution of the combined color component to the 3rd output primary (B').

The disclosed methods and systems provide independent control over the primary and secondary image colors, and the white level by allowing the correction of color image data on a pixel-by-pixel basis by using an expanded color gamut that includes negative RGB values.

DETAILED DESCRIPTION OF THE PREFERRED EMBODIMENTS

As described above, the spectrum and maximum intensity of the primary color sources, whether color filters acting on a white light beam or light sources capable of outputting light in a portion of the visible spectrum, determine several key characteristics of a display system such as the white point and the purity of the secondary colors.

For example, a system designer may select a green color filter with a relatively broad pass band in order to provide a very high number of lumens to the projected image-especially when coupled with a light source that outputs a high proportion of its energy in the green spectrum band. The disproportionate amount of green light contributed to the white light output, however, results in the white light having a greenish tinge. While the excess green contributed to the white light may not be objectionable, the high green level will result in secondary colors such as yellow and cyan having too much green. What is needed is an efficient way to individually adjust the purity of not only the primary colors, but also the secondary colors and the white point while preserving a color gamut that is relevant to the display system even though that color gamut may fall outside of a CRT reference display RGB color space.

A method and apparatus has been developed that enables individual control of multiple color properties in a primary color display system and a range of color space including negative RGB values. The method and apparatus disclosed herein allow the system designer great flexibility in the selection of primary color sources, while providing a means to compensate for the undesirable side effects of the combination of primary color sources and to provide color correction capabilities in an expanded color gamut system.

While the method and apparatus taught herein with be disclosed primarily in terms of a three-color primary system that uses a white light source in conjunction with three color filters to provide three light beams that are perceived as primary colors, it should be understood that this disclosure is intended to include applications using other means of providing the primary colors such as separate light sources, separate primary color light sources, beam splitters, and color wheels. Furthermore, although this disclosure primarily describes a display system using Red, Green, and Blue (RGB) primary colors, it is intended to include and address other color systems, whether additive or subtractive, such as systems whose component signals include Cyan, Magenta, and Yellow (CMY), Cyan, Magenta, Yellow and Black (CMYK), and luminance and chrominance (YUV) signals.

Figure 1:
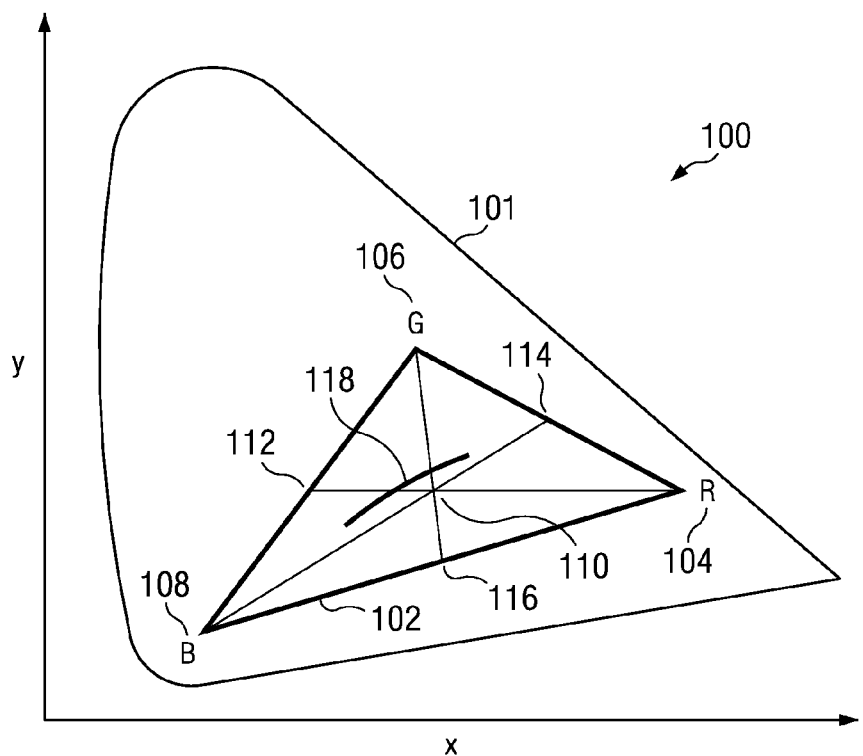
FIG. 1 is a chromaticity diagram of the color space of a first display system.

FIG. 1 is a CIE 1931 xy chromaticity diagram 100 of a first display system. The color space 101 is the response of the human eye and is beyond replication by the color gamut of an additive color synthesis system. The color space 102 of the display system is determined by the location of the system's red point 104, blue point 108, green point 106, and the relative intensity of the light provided at each of these primary color points. If each primary color provides the same intensity contribution to the white light level, then the secondary color points will be located midway between the primary color points, and the white point 110 will be located at the intersection of the lines connecting the primary and secondary colors as shown in FIG. 1. In FIG. 1, the cyan point 112, yellow point 114, and magenta point 116, are all located midway between the primary color points. The white point 110 shown in FIG. 1 is slightly to the magenta side of a reference white line 118.

Figure 2:
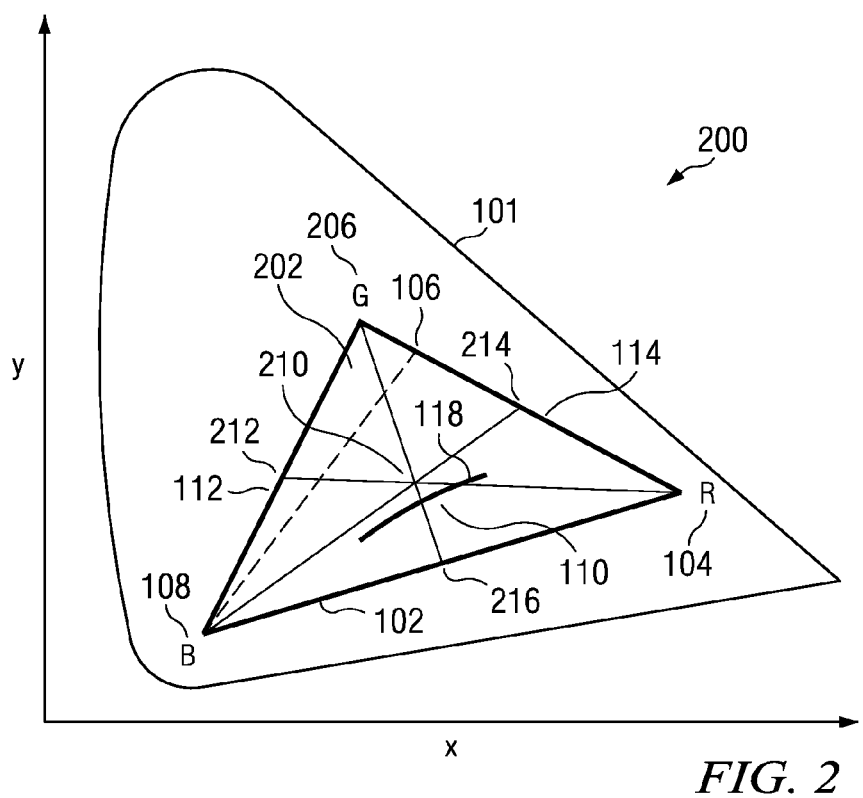
FIG. 2 is a chromaticity diagram of the color space of a second display system showing shifted secondary color points and expanded color space.

FIG. 2 is a chromaticity diagram 200 of a second display system shown relative to the first display system. The second display system has the same red, and blue points as the display system represented in FIG. 1, but a new green point 206 has expanded the color gamut and the relative intensity of the primary colors has changed. Because the color space has expanded and shifted, new colors are available and the secondary color points, as well as the white point, are shifted. In the example shown in FIG. 2, the red light source provides less intensity than the blue light source, and much less than the green light source, resulting in a white point 210 that is shifted toward cyan. The yellow point 214 is shifted toward the green point 106, and the magenta point 216 is shifted toward the blue point 108. Although the display system represented by FIG. 2 provides a lot of illumination to a white point that may be suitably close to the reference white line 118 in many applications, when the display system attempts to display a non-primary color represented by linear RGB data, the color will have a greenish or bluish tint. Additionally, the new color space 202 is beyond the operational color spectrum of conventional CRT monitors, and although accounted for in the industry through specifications including ITU-R BT.709 & ITU-R BT.1361, adjustments in an expanded color gamut have been insubstantial. Projectors with a larger color gamut can behave like conventional CRTs and, when negative RGB values are present, show the expanded color gamut whereas conventional CRTs would ignore the negative signals.

One means of compensating for the undesirable side effects of a given set of primary color sources is to provide secondary color and white information as well as the primary color information, and to use this additional information to generate a set of output primary data that compensates for the undesirable side effects. The secondary color and white intensity information is used to alter the amount each primary color source contributes to the secondary colors and white. In effect, this method transforms a three primary color system into a seven primary color system (RGBCMYW) including the three primary colors (RGB), the three secondary colors (CMY), and white (W) by remapping the color space to provide additional control over the secondary colors and white. The remapping system can be written as:

$$\begin{bmatrix} R' \\ G' \\ B' \end{bmatrix} = \begin{bmatrix} Rr & Rg & Rb & Rc & Rm & Ry & Rw \\ Gr & Gg & Gb & Gc & Gm & Gy & Gw \\ Br & Bg & Bb & Bc & Bm & By & Bw \end{bmatrix} \begin{bmatrix} R \\ G \\ B \\ C \\ M \\ Y \\ W \end{bmatrix} \quad \text{Equation 1}$$

Analysis of Equation 1 reveals that the coefficients represent three groups of signals: primary color (P) coefficients, represented by Rr, Rg, Rb, Gr, Gg, Gb, Br, Bg, and Bb; secondary color (S) coefficients, represented by Rc, Rm, Ry, Gc, Gm, Gy, Bc, Bm, and By; and white (W) coefficients, represented by Rw, Gw, and Bw.

Each primary and secondary color, as well as white, can be controlled independently. For example, by setting the coefficient in location "Gy" to a value less than 1, the amount of green contributing to a yellow color is reduced, without affecting the contribution of green to white, pure green, or cyan. Each color, including the primary colors, can be manipulated in a similar manner—coefficient "Bg" allows blue to be added to green.

The matrix of Equation 1 provides a powerful tool for the independent control of each of the seven colors (RGBCYMW).

Figure 3:
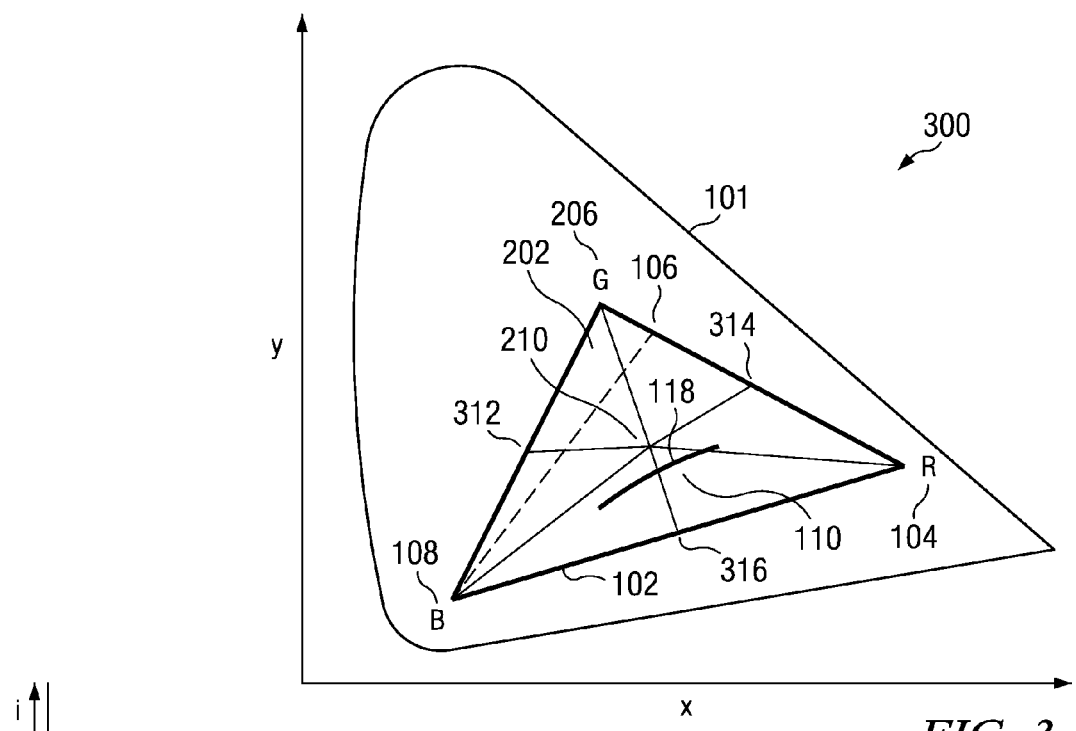
FIG. 3 is a chromaticity diagram of the color space of a third display system showing the independent adjustment of the secondary color points.

FIG. 3 is a chromaticity diagram 300 for the display system represented in FIG. 2 after the secondary colors have been altered as described above. As shown in FIG. 3, the yellow point 314 and magenta point 316 have been moved toward the red point 104, while the cyan point 312 has been moved toward the blue point 108.

The method taught thus far provides for the adjusting of the color response of a display system, but a straight-away implementation of the matrix operation of Equation 1 in a high resolution display system would require, for example, up to 21 multiplication operations, each using 14 bit inputs, 10 to 14 bit coefficients, and providing 14 bit outputs. The image data could be processed as described in Equation 1 and stored for later display. Performing the computations in real time, however, would require more processing power than is economically feasible to include in many display systems at this time. Therefore, there is a great need to simplify the calculations while allowing for negative RBG signals in order to enable the inclusion of the color space control features in display systems that do not have sufficient processing power to implement Equation 1.

In previous art, the combination of the seven primary color input values (RGBCMYW) could be expressed using only three values, a primary color, a secondary color, and a white level, in PSW color space in a resulting PSW matrix. The contribution of negative RGB pixel values increases the difficulty of calculations and causes conventional calculation methods to break down. Mapping the color space directly to a 3×3 matrix using just relative signal magnitudes would not necessary select the correct coefficient values and may result in erroneous data.

A solution to providing the correct color correction is to correctly select the color components from the 3×7 matrix of equation 1 using both positive and negative RGB values. The remapping of the seven primary color system to the RGB space is shown in Equation 2.

$$\begin{bmatrix} R' \\ G' \\ B' \end{bmatrix} = \begin{bmatrix} PC1 & SC1 & WC1 \\ PC2 & SC2 & WC2 \\ PC3 & SC3 & WC3 \end{bmatrix} \begin{bmatrix} P \\ S \\ C \end{bmatrix} \quad \text{Equation 2}$$

The complexity of implementing Equation 2 is the determination of the values for each of the coefficients PC1, SC1, WC1, PC2, SC2, WC2, PC3, SC3, and WC3. As mentioned above, the primary colors coefficients (P) are represented by Rr, Rg, Rb, Gr, Gg, Gb, Br, Bg, and Bb; the secondary color (S) coefficients are represented by Rc, Rm, Ry, Gc, Gm, Gy, Bc, Bm, and By; and the white (W) coefficients are represented by Rw, Gw, and Bw. Therefore, the first three columns of the coefficient matrix (1, 2, 3) of Equation 1 are used to control the primary colors, the second group of three columns (4, 5, 6) of the coefficient matrix of Equation 1 are used to control the secondary colors. When all RGB values are positive, the last column (7), controls the white color and when one or two RGB values are negative, a primary color coefficient, Rr, Rg, Rb, Gr, Gg, Gb, Br, Bg, and Bb (columns 1, 2, or 3) controls the white. If all three RGB values are negative, the signal should be clamped to black level since no positive color or luminance information is available. Thus, the coefficients for Equation 2 may be taken directly from the coefficients of Equation 1—by selecting the columns based on the identity of the primary, secondary, and white colors of Equation 2, which is determined by the relative strengths of the red, green, and blue inputs.

Based on possible R, G, and B signal values, nineteen distinct variations are possible when taking into consideration negative RGB values. To facilitate accurate and timely decisions, a method has been devised as represented in Table 1, below, which provides the method to correlate the 3×7 matrix in Equation 1 to the 3×3 matrix of Equation 2. Using logic based on Table 1, and using the magnitudes of the RGB component and the number of negative components, one can determine the proper PSW calculation and column selection to select the proper 3×3 matrix in which the color correction coefficients will reside.

TABLE 1

| # Order | Neg | r < g | g < b | r < b | r < 0 | g < 0 | b < 0 | PSW Calculations P | S | W | 3 × 3 Matrix Column Select Pc | Sc | Wc |
|---|---|---|---|---|---|---|---|---|---|---|---|---|---|
| 1 r > g > b | 0 | 0 | 0 | 0 | 0 | 0 | 0 | r-g | g-b | b | 1 | 6 | 7 |
| 2 r > b > g | 0 | 0 | 1 | 0 | 0 | 0 | 0 | r-b | b-g | g | 1 | 5 | 7 |
| 3 g > r > b | 0 | 1 | 0 | 0 | 0 | 0 | 0 | g-r | r-b | b | 2 | 6 | 7 |
| 4 g > b > r | 0 | 1 | 0 | 1 | 0 | 0 | 0 | g-b | b-r | r | 2 | 4 | 7 |
| 5 b > r > g | 0 | 0 | 1 | 1 | 0 | 0 | 0 | b-r | r-g | g | 3 | 5 | 7 |
| 6 b > g > r | 0 | 1 | 1 | 1 | 0 | 0 | 0 | b-g | g-r | r | 3 | 4 | 7 |
| 7 r > g > b | 1 | 0 | 0 | 0 | 0 | 0 | 1 | r-g | g | b | 1 | 6 | 3 |
| 8 r > b > g | 1 | 0 | 1 | 0 | 0 | 1 | 0 | r-b | b | g | 1 | 5 | 2 |
| 9 g > r > b | 1 | 1 | 0 | 0 | 0 | 0 | 1 | g-r | r | b | 2 | 6 | 3 |
| 10 g > b > r | 1 | 1 | 0 | 1 | 1 | 0 | 0 | g-b | b | r | 2 | 4 | 1 |
| 11 b > r > g | 1 | 0 | 1 | 1 | 0 | 1 | 0 | b-r | r | g | 3 | 5 | 2 |
| 12 b > g > r | 1 | 1 | 1 | 1 | 1 | 0 | 0 | b-g | g | r | 3 | 4 | 1 |
| 13 r > g > b | 2 | 0 | 0 | 0 | 0 | 1 | 1 | r | g | b-g | 1 | 4 | 3 |
| 14 r > b > g | 2 | 0 | 1 | 0 | 0 | 1 | 1 | r | b | g-b | 1 | 4 | 2 |
| 15 g > r > b | 2 | 1 | 0 | 0 | 1 | 0 | 1 | g | r | b-r | 2 | 5 | 3 |
| 16 g > b > r | 2 | 1 | 0 | 1 | 1 | 0 | 1 | g | b | r-b | 2 | 5 | 1 |
| 17 b > r > g | 2 | 0 | 1 | 1 | 1 | 1 | 0 | b | r | g-r | 3 | 6 | 2 |
| 18 b > g > r | 2 | 1 | 1 | 1 | 1 | 1 | 0 | b | g | r-g | 3 | 6 | 1 |
| 19 don't care | 3 | x | x | x | 1 | 1 | 1 | 0 | 0 | 0 | 1 | 6 | 7 |

Figure 4:
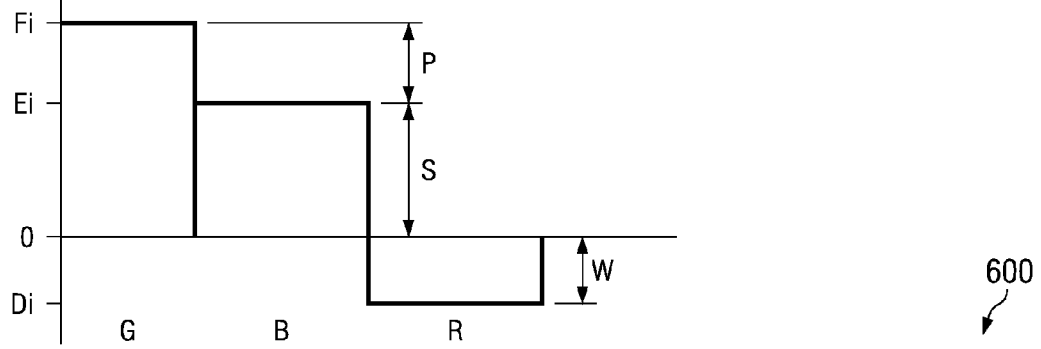
FIG. 4 is a graph of three hypothetical primary color intensity data values for a single pixel showing the allocation of RGB (Red, Green Blue) color data into PSW (Primary, Secondary, White) color space.

FIG. 4 is a graph of an example using three primary color intensity data values (r, g, b) for a single pixel with color intensity values Di, Ei, and Fi corresponding respectively to the R, B, and G signals. In the example, there is one negative color component, R, and the magnitudes of the RGB signals follow the condition g>b>r, which corresponds to case 10 in Table 1. The red intensity ("r") given by the value "Di" is located in the negative RGB color space, and following the PSW calculations column of the table, red with value "Di" will represent the white (W) component of the pixel. The secondary color component (S) is assigned to the value of the B color component, which has an intensity value "Ei" from FIG. 4. Contributing to the primary color component (P), Table 1 indicates the calculation corresponding to the values represented by g–b, will be used and the corresponding intensity value would therefore be Fi–Ei. Intensity values from FIG. 4, assigned to the color components, are summarized by P=Fi–Ei, S=Ei, and W=Di.

Case 10 in Table 1 dictates that columns 2, 4 and 1 be selected for the P, S, and W matrix columns respectively. This indicates that the primary color component (P) is green, the secondary color component (S) is cyan, and the white color component (W) is red. As shown in this example, the decisions based on the method in table 10 are straightforward and simplify the process. Per the process defined in FIG. 6 (below), the remaining step is to multiply the 3×3 matrix to obtain the corrected RBG value.

Figure 5:
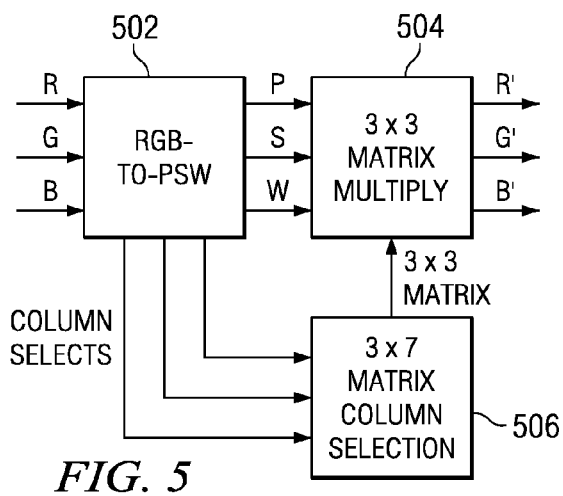
FIG. 5 is a block diagram of a system architecture for improving color correction.

FIG. 5 is a block diagram depicting one embodiment of the improved color correction with negative RGB support. In the FIG., RGB data for a given pixel is input into the RGB-to-PSW converter 502. The RGB-to-PSW converter 502 compares the three intensity values and outputs the greatest on signal P, the median on signal S, and the minimum on signal W. P, S, and W are then driven to one set of inputs in the 3×3 multiplier 504. The RGB-to-PSW converter 502 also drives three signals to a column selection block 506. The column selection block 506 provides the coefficients used by the 3×3 multiplier 504. The output of the 3×3 multiplier 504 is the processed RGB data of Equations 1 & 2.

Figure 6:
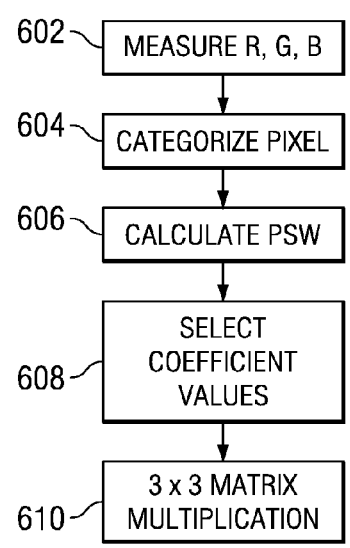
FIG. 6 is a process diagram showing the steps to selecting and calculating PSW values and selecting matrix columns for multiplication to obtain the desired color correction.

FIG. 6 illustrates a process flow for the conversion of color component signal inputs to adjusted color component signals, such as the conversion illustrated in the block diagram of FIG. 5 in which the R', G', and B' signals are created as adjusted signals from input color component signals R, G, and B. In alternative embodiments, adjusted PSW signals can be created from input RGB signals or adjusted RGB signals can be created from input PSW signals.

In the flow 600 illustrated in FIG. 6, at block 602 the intensity of the input color component signals, RGB, are measured and are assigned numeric values. Pixels of the image are then categorized at block 604 according to their respective magnitudes and in accordance with the cases specified in the exemplary Table 1, above.

In further accord with Table 1, PSW values are calculated at block 606 by the RGB-to-PSW conversion circuit 502 (see FIG. 5). At block 608, then, the coefficient values for the matrix multiplication, or more generally matrix operation, circuit 504 are selected according to the detected color intensity data values and further in accordance with the exemplary selections of Table 1. At this process block, using the 3×7 matrix column selection circuit 506 in the example of FIG. 5, the coefficients for the matrix operation are applied in the matrix operation circuit 504.

Still referring to FIG. 6, at process block 610 the matrix operation circuit 504 will operate on the PSW signals (or other signals, according to the particular application) to generate the adjusted color component signals in accordance with the selected matrix coefficients.

The concepts taught herein can be extended to the use of other points in the color space without departing from the intended teachings hereof. For instance, the color correction can be implemented before or after a gamma correction operation, or implemented as part of the degamma scaling operation. Likewise, other embodiments use logic thresholds to sample $YC_RC_B$ values to determine the proper primary and secondary colors and implement the color correction techniques in a $Y'C_R'C_B'$ to R'G'B' conversion matrix.

The color correction described herein is applicable to both additive and subtractive color systems. The term "combined primary" will be used to describe the mixture of all of the primary colors whether describing white in an additive system or black in a subtractive system.

Figure 7:
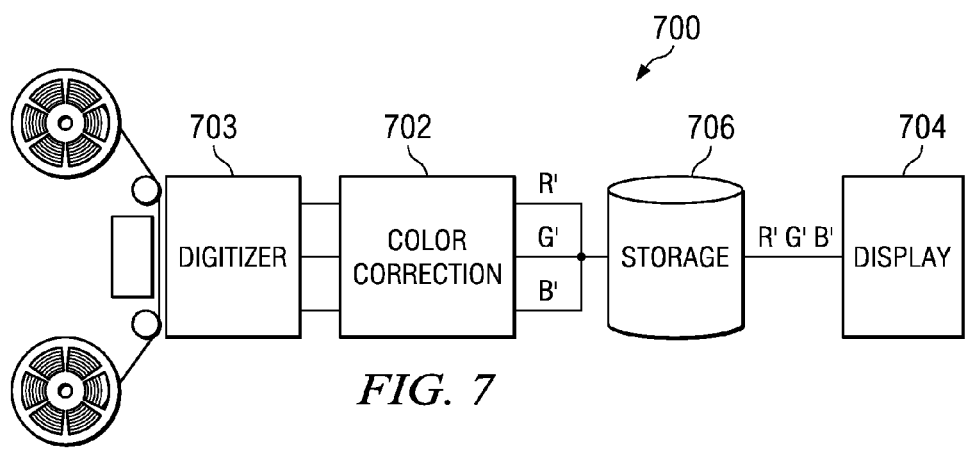
FIG. 7 is a block diagram of a film-to-video transfer system utilizing the improved color correction of the present invention to translate digitized image data prior to storing and later retrieving and displaying the translated image data.

FIG. 7 is a block diagram of a film-to-video transfer system 700 utilizing the improved color correction 702 of the present invention to translate digitized image data prior to storing the digitized data.

The color correction described may be performed by an image transfer-machine or scanner 703 when capturing or digitizing an image so that color corrected data is produced, or the color correction may be performed by the display system as an image is being displayed. The color corrected data may be stored in a digital storage medium 706 later retrieved and displayed by display system 704.

Figure 8:
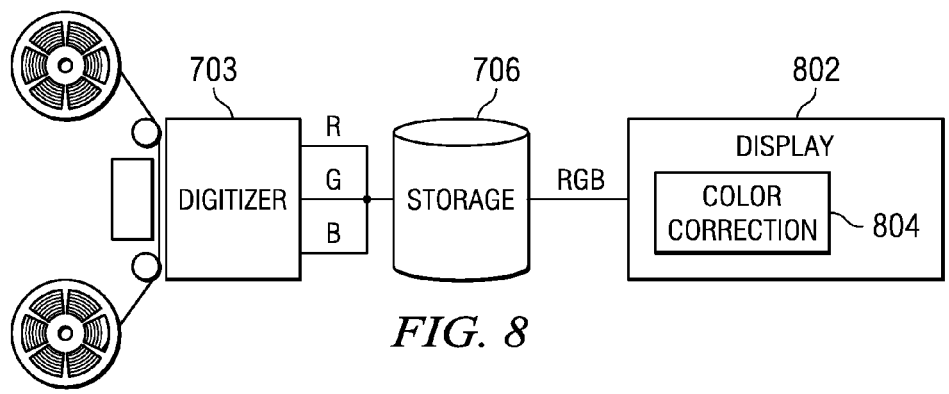
FIG. 8 is a block diagram of a film-to-video transfer system showing a display device performing the improved color correction operation prior to the display of the transferred video data.

Alternatively, in accordance with FIG. 8, the color correction is included in an enhanced gamut display system 802 to provide color correction for input image signals. The FIG. shows a display system 802 with the improved color correction 804 capability. The color correction 804 can be selected by a viewer, for example through the use of a remote control and on-screen programming, to enable the viewer to select from several color correction modes. The use of multiple color correction modes allows the user to optimize the color correction based on the selected image source.

Figure 9:
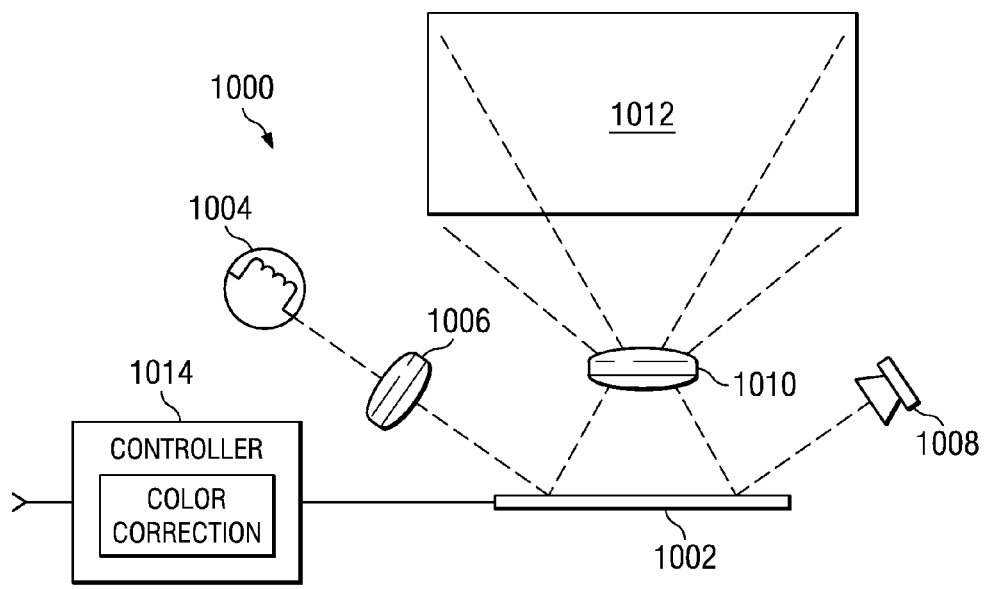
FIG. 9 is a schematic view of a projection display system utilizing the improved color correction of the present invention.

FIG. 9 is a schematic view of an image projection system 1000 incorporating the improved color correction of the present invention. In FIG. 9, light from light source 1004 is focused on a micromirror array 1002 by lens 1006. Although shown as a single lens, lens 1006 may comprise a group of lenses and mirrors, which together focus and direct light from the light source 1004 onto the surface of the micromirror device 1002. Controller 1014 receives image intensity data and control signals and processes them according to the teachings herein to obtain color corrected image intensity data signals. The color corrected image intensity data signals are then transferred from controller 1014 to the micromirror device 1002. The color corrected image intensity data causes some mirrors to rotate to an on position and others to rotate to an off position. Mirrors rotated to an off position reflect light to a light trap 1008 while mirrors rotated to an on position reflect light to projection lens 1010, which is shown as a single lens for simplicity. Projection lens 1010 focuses the light modulated by the micromirror device 1002 onto an image plane or screen 1012.

Thus, although there has been disclosed to this point a particular embodiment for a method and apparatus for improved color correction, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

The invention claimed is:

1. A system for adjusting a plurality of component color signals for a display, the system, comprising:
    (a) an input for receiving the component color signals;
    (b) a detection circuit connected to the input and configured to detect at least one characteristic of the received component color signals;
    (c) an adjustment circuit connected to the input for receiving the component color signal and for creating adjusted component color signals from the received component color signals according to a certain technique, wherein the certain technique is changed according to the at least one detected characteristic.

2. A system according to claim 1 wherein the adjustment circuit is a circuit for performing a matrix-based arithmetic operation on at least two of the plurality of component color signals.

3. A system according to claim 2 and further comprising a matrix coefficient selection circuit connected to the detection circuit and the adjustment circuit, whereby the coefficients applied to the matrix-based arithmetic operations being carried out in the adjustment circuit are selected according to the at least one detected characteristic.

4. A system according to claim 2 wherein the matrix operation is a matrix-based multiplication operation.

5. A system according to claim 4 wherein the matrix operation is a matrix multiplication of the received component color signals by a coefficient matrix of at least a 3×3 dimension.

6. A system according to claim 5 wherein the matrix-based arithmetic operation is a matrix multiplication wherein the adjusted component color signals comprise adjusted red, green, and blue component color signals.

7. A system according to claim 6 wherein the adjusted component color signals are primary, secondary, and white component color signals.

8. A system according to claim 7 wherein the matrix-based arithmetic operation is a matrix multiplication and wherein the adjusted component color signals are adjusted primary, secondary, and white component color signals.

9. A system according to claim 8 wherein the received component color signals are red, green and blue color signals.

10. A system according to claim 9 wherein the adjustment applied by the adjustment circuit is according to a technique determined by the relative intensities among the received red, green and blue color signals.

11. A system according to claim 1 and further comprising an RGB-to-PSW conversion circuit, wherein the RGB-to-PSW conversion circuit is further operable as the detection circuit.

12. A system according to claim 11, wherein the adjustment circuit receives PSW signals from the RGB-to-PSW conversion circuit and creates the adjusted component color signals from the PSW signals.

13. A system according to claim 1, wherein the received component color signals are red, green, and blue signals, and wherein the adjusted component color signals are adjusted red, green, and blue signals.

14. A system according to claim 13, wherein at least one of the adjusted red, green, and blue signals is adjusted relative to its corresponding received component color signal.

15. A system according to claim 13, wherein at least one of the received red, green, and blue signals has a negative value.

16. A method of converting a plurality of component color signals to a plurality of adjusted component color signals for a display system, the method, comprising:
    (a) receiving the plurality of component color signals;
    (b) detecting at least one characteristic of the received component color signals;
    (c) providing the plurality of adjusted component color signals from the received plurality of component color signals, whereby the an adjustment to the component color signals is made according to a technique that is adapted by the at least one detected characteristic.

17. A method according to claim 16 wherein the plurality of received component color signals are at least red, green, and blue component color signals.

18. A method according to claim 17 wherein before the adjusting of the received component color signals, the received the received red, green, and blue color signals are converted to primary, secondary, and white component color signals.

19. A method according to claim 18 wherein the plurality of adjusted component color signals are provided as adjusted red, green, and blue component color signals by converting the primary, secondary, and white component color signals according to the technique that is adapted by the at least one detected characteristic.

20. A method according to claim 16, wherein the received component color signals are red, green, and blue signals, and wherein the adjusted component color signals are adjusted red, green, and blue signals.

21. A method according to claim 20, wherein at least one of the adjusted red, green, and blue signals is adjusted relative to its corresponding received component color signal.

22. A method according to claim 20, wherein at least one of the received red, green, and blue signals has a negative value.

23. A method of converting RGB component color signals to adjusted RGB component signals for a display system, the method, comprising:
   (a) receiving the RGB component color signals;
   (b) detecting at least one characteristic of the received RGB component color signals;
   (c) generating PSW component color signals from the received RGB component color signals;
   (d) generating the adjusted RGB component signals from the PSW component color signals according to a technique based on the detecting of the at least one characteristic of the received RGB component color signals.

24. A method according to claim 23 wherein the at least one detected characteristic of the received RGB component color signals is the relative intensity among the "R," the "G," and the "B" components of the received component color signals.

25. A method according to claim 24 wherein the technique comprises applying a set of matrix coefficients for a matrix multiplication with the PSW component color signals.

26. A method according to claim 25 wherein the matrix coefficients are selected according to a look-up table based on the relative intensity among the "R," the "G," and the "B" components of the received component color signals.

27. A method according to claim 23, wherein at least one of the adjusted RGB component signals is generated relative to its corresponding received RGB component color signal.

28. A method according to claim 23, wherein at least one of the received RGB component color signals has a negative value.

29. A system for adjusting a plurality of RGB component color signals for a display, the system comprising:
   (a) an input for receiving the RGB component color signals, at least one of the received RGB component color signals having a negative value;
   (b) a detection circuit connected to the input and configured to detect at least one characteristic of the received RGB component color signals; and
   (c) an adjustment circuit connected to the input for receiving the RGB component color signal and for creating adjusted RGB color signals based on corresponding ones of the received RGB component color signal according to a certain technique, wherein the certain technique is changed according to the at least one detected characteristic.

30. A method of converting a plurality of RGB component color signals to a plurality of adjusted RGB color signals for a display system, the method comprising:
   (a) receiving the plurality of RGB component color signals, at least one of the received RGB component color signals having a negative value;
   (b) detecting at least one characteristic of the received RGB component color signals;
   (c) providing the plurality of adjusted RGB color signals based on corresponding ones of the received plurality of RGB component color signals according to a technique that is adapted according to the at least one detected characteristic.

* * * * *